(12) United States Patent
Nishida

(10) Patent No.: US 10,960,486 B2
(45) Date of Patent: Mar. 30, 2021

(54) METHOD OF PRODUCING ENDLESS METAL RING

(71) Applicant: TOYOTA JIDOSHA KABUSHIKI KAISHA, Toyota (JP)

(72) Inventor: Koji Nishida, Nisshin (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 91 days.

(21) Appl. No.: 16/299,253

(22) Filed: Mar. 12, 2019

(65) Prior Publication Data

US 2019/0299322 A1   Oct. 3, 2019

(30) Foreign Application Priority Data

Mar. 30, 2018   (JP) .............................. JP2018-068838

(51) Int. Cl.
*B23K 11/02* (2006.01)
*B23K 11/34* (2006.01)
(Continued)

(52) U.S. Cl.
CPC .......... *B23K 11/02* (2013.01); *B23K 11/0026* (2013.01); *B23K 11/04* (2013.01); *B23K 11/16* (2013.01); *B23K 11/34* (2013.01); *B23K 31/027* (2013.01); *C21D 6/002* (2013.01); *C21D 6/004* (2013.01); *C21D 6/005* (2013.01); *C21D 6/008* (2013.01); *C21D 9/40* (2013.01); *C21D 9/50* (2013.01); *C22C 38/02* (2013.01); *C22C 38/04* (2013.01); *C22C 38/18* (2013.01);
(Continued)

(58) Field of Classification Search
CPC ..... B23K 11/02; B23K 11/0026; B23K 11/04; B23K 11/16; B23K 11/34; B23K 31/027; B23K 2103/18; B23K 2101/30; B23K 2101/18; B23K 2103/04; B23K 2101/04; C21D 6/002; C21D 6/004; C21D 6/005; C21D 6/008; C21D 9/40; C21D 9/50; C21D 2251/04; C22C 38/02; C22C 38/04; C22C 38/18; C22C 38/22; C22C 38/24; C22C 38/34

See application file for complete search history.

(56) References Cited

U.S. PATENT DOCUMENTS 3,619,547 A * 11/1971 Cavagnero ............. B23K 11/04
148/521

FOREIGN PATENT DOCUMENTS

EP   2 889 104 A1   7/2015
JP   61-176479   8/1986
(Continued)

OTHER PUBLICATIONS

JP-5768746-B2 translation (Year: 2015).*
JP2011195861A translation (Year: 2011).*

*Primary Examiner* — Anthony J Zimmer
*Assistant Examiner* — Ricardo D Morales
(74) *Attorney, Agent, or Firm* — Oblon, McClelland, Maier & Neustadt, L.L.P.

(57) ABSTRACT

A method of producing an endless metal ring by butting and welding ends of a steel plate includes a welding process in which, while the ends of the steel plate are heated at a temperature lower than a melting temperature, the ends are pressed against each other and welded by butt welding; and a heat treatment process in which heating is performed at an austenite transformation temperature or lower after the welding process.

6 Claims, 4 Drawing Sheets

| (51) | Int. Cl. | |
|---|---|---|
| | C21D 6/00 | (2006.01) |
| | C21D 9/40 | (2006.01) |
| | C22C 38/02 | (2006.01) |
| | C22C 38/04 | (2006.01) |
| | C22C 38/22 | (2006.01) |
| | C22C 38/24 | (2006.01) |
| | C21D 9/50 | (2006.01) |
| | B23K 31/02 | (2006.01) |
| | C22C 38/18 | (2006.01) |
| | C22C 38/34 | (2006.01) |
| | B23K 11/16 | (2006.01) |
| | B23K 11/04 | (2006.01) |
| | B23K 11/00 | (2006.01) |
| | B23K 103/18 | (2006.01) |
| | B23K 101/30 | (2006.01) |
| | B23K 103/04 | (2006.01) |
| | B23K 101/04 | (2006.01) |
| | B23K 101/18 | (2006.01) |

(52) U.S. Cl.
CPC .............. *C22C 38/22* (2013.01); *C22C 38/24* (2013.01); *C22C 38/34* (2013.01); *B23K 2101/04* (2018.08); *B23K 2101/18* (2018.08); *B23K 2101/30* (2018.08); *B23K 2103/04* (2018.08); *B23K 2103/18* (2018.08); *C21D 2251/04* (2013.01)

(56) References Cited

FOREIGN PATENT DOCUMENTS

| JP | 02-025281 | 1/1990 |
|---|---|---|
| JP | 2011-195861 | 10/2011 |
| JP | 2011195861 A * | 10/2011 |
| JP | 2012-250266 | 12/2012 |
| JP | 2015-120200 | 7/2015 |
| JP | 5768746 B2 * | 8/2015 |

* cited by examiner

NO DENDRITIC PHASE

DENDRITIC PHASE

METHOD OF PRODUCING ENDLESS METAL RING

INCORPORATION BY REFERENCE

The disclosure of Japanese Patent Application No. 2018-068838 filed on Mar. 30, 2018 including the specification, drawings and abstract is incorporated herein by reference in its entirety.

BACKGROUND

1. Technical Field

The present disclosure relates to a method of producing an endless metal ring.

2. Description of Related Art

As a continuously variable transmission (CVT), a belt type CVT is known. As a power transmission belt for a belt type CVT, an endless metal belt including a belt member formed by stacking metal rings and a plurality of elements supported by the belt member is known. The belt member receives tension, bending stress, a frictional force, and the like during power transmission. Therefore, the belt member and the metal rings constituting the belt member are required to have characteristics such as strength and anti-friction properties, and various examinations have been performed. The metal ring for a belt member is generally processed into a ring shape by welding ends of a steel plate.

In Japanese Unexamined Patent Application Publication No. 2011-195861 (JP 2011-195861 A), the inventors disclose a continuously variable transmission belt containing specific chemical components and having a specific relationship between the hardness of a cross section at a depth of 0.03 mm from the outermost surface and the internal hardness, as a continuously variable transmission belt having high strength and excellent wear resistance and capable of being provided at lower cost than before. In JP 2011-195861 A, in order to produce the continuously variable transmission belt, a ring component after welding is heated at 850° C. to 1000° C. which is higher than an A3 transformation point and then heated again at 640° C. to 750° C.

Japanese Unexamined Patent Application Publication No. 2012-250266 (JP 2012-250266 A) discloses a method of producing a metal ring including a welding process, a barrel process, and a nitriding process, and in which a welded part polishing process of removing a protruding part present in a thick welded part is provided between the welding process and the barrel process.

Japanese Unexamined Patent Application Publication No. 2015-120200 (JP 2015-120200 A) discloses a method of forming a steel ring in which a strip component such as strip-shaped maraging steel is subjected to laser welding or plasma arc welding, and welding is performed in two stages from both ends of a part to be welded to the vicinity of the center. However, in the method of JP 2015-120200 A, constriction occurs in the welded part due to surface tension and the welded part may become thinner than the strip component.

In addition, in Japanese Unexamined Patent Application Publication No. H02-25281 (JP 02-25281 A) and Japanese Unexamined Patent Application Publication No. S61-176479 (JP 61-176479 A), methods of welding a metal ring by butt welding are disclosed.

SUMMARY

When a steel plate containing about 0.30 to 0.70% of carbon is welded, a dendritic phase having a dendritic form (branching form) is likely to be formed in a welded part. Thus, it is known that heating is performed at an austenite transformation temperature or higher to homogenize the steel plate after welding (for example, JP 2011-195861 A). However, when air-cooling is performed after heating is performed at an austenite transformation temperature or higher, the steel plate becomes hard and rolling thereafter becomes difficult. Therefore, the steel plate heated at the austenite transformation temperature or higher needs to be cooled slowly for a long time or as described in JP 2011-195861 A, the steel plate needs to be air-cooled once and then heated at an austenite transformation temperature or lower again.

The present disclosure provides a method of producing an endless metal ring in which constriction in a welded part is reduced, the method eliminating the need of performing a heat treatment at a temperature that is equal to or higher than an austenite transformation temperature as a heat treatment for homogenizing the hardness after welding, thereby providing excellent productivity.

A first aspect of the present disclosure relates to a method of producing an endless metal ring by butting and welding ends of a steel plate having a chemical composition including 0.30 to 0.70% by mass of C, 2.50% by mass or less of Si, 1.00% by mass or less of Mn, 1.00 to 4.00% by mass of Cr, 0.50 to 3.00% by mass of Mo, and 1.00% by mass or less of V, the chemical composition satisfying a relationship of Formula 1, and a remainder of the chemical composition including Fe and unavoidable impurities. The Formula 1 is $159 \times C$ (%)$+91 \times Si$ (%)$+68 \times Cr$ (%)$+198 \times Mo$ (%)$+646 \geq 1000$. The production method includes a welding process in which, while the ends of the steel plate are heated at a temperature lower than a melting temperature, the ends are pressed against each other and welded by butt welding; and a heat treatment process in which heating is performed at an austenite transformation temperature or lower after the welding process.

The method of producing an endless metal ring according to the above aspect may include a process of removing a protruding part after the welding process.

In the method of producing an endless metal ring according to the above aspect, the process of removing the protruding part may be performed after the heat treatment process.

A second aspect of the present disclosure relates to a method of producing an endless metal ring by butting and welding ends of a steel plate having a chemical composition including 0.30 to 0.70% by mass of C, 2.50% by mass or less of Si, 1.00% by mass or less of Mn, 1.00 to 4.00% by mass of Cr, 0.50 to 3.00% by mass of Mo, and 1.00% by mass or less of V, the chemical composition satisfying a relationship of Formula 1, and a remainder of the chemical composition including Fe and unavoidable impurities. The Formula 1 is $159 \times C$ (%)$+91 \times Si$ (%)$+68 \times Cr$ (%)$+198 \times Mo$ (%)$+646 \geq 1000$. The production method includes a welding process in which, while the ends of the steel plate are heated at a melting temperature or higher, the ends are pressed against each other such that a melted part as a protruding part is extruded, and the ends are welded by butt welding; and a heat treatment process in which heating is performed at an austenite transformation temperature or lower after the welding process.

The method of producing an endless metal ring according to the above aspect may include a process of removing the protruding part after the welding process.

In the method of producing an endless metal ring according to the above aspect, the process of removing the protruding part may be performed after the heat treatment process.

According to the above aspect of the present disclosure, is it possible to provide a method of producing an endless metal ring in which constriction in a welded part is reduced, the method eliminating the need of performing a heat treatment at a temperature that is equal to or higher than an austenite transformation temperature as a heat treatment for homogenizing the hardness after welding, thereby providing excellent productivity.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
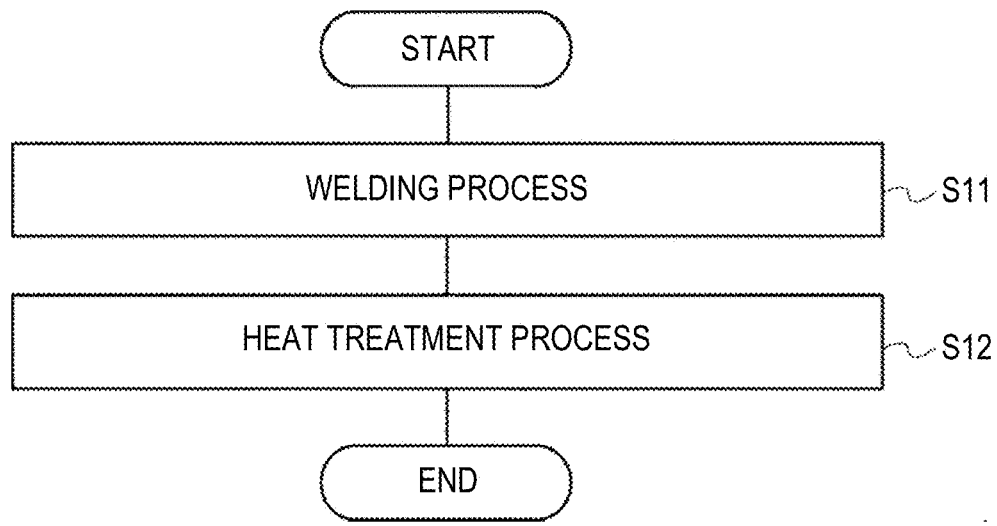
FIG. 1 is a flowchart showing an example of a method of producing an endless metal ring of the present embodiment.

A steel plate used in a method of producing an endless metal ring of the present embodiment will be described. The steel plate used in the present embodiment is a steel plate having a chemical composition which includes 0.30 to 0.70% by mass of C, 2.50% by mass or less of Si, 1.00% by mass or less of Mn, 1.00 to 4.00% by mass of Cr, 0.50 to 3.00% by mass of Mo, and 1.00% by mass or less of V. The chemical composition satisfies the relationship of Formula 1. The Formula 1 is 159×C (%)+91×Si (%)+68×Cr (%)+198×Mo (%)+646≥1000. The remainder of the chemical composition includes Fe and unavoidable impurities. With the steel plate, it is possible to obtain an endless metal ring having excellent tensile strength. The chemical composition of the steel plate will be described below.

A content of C (carbon) is set to 0.30% or more in order to secure the strength and toughness. On the other hand, a content of C is set to 0.70% or less in order to reduce a decrease in ductility and toughness due to formation of coarse carbides.

A content of Si (silicon) is set to 2.5% or less in order to reduce a decrease in ductility and deterioration of nitriding properties. On the other hand, the content of Si may be 0.10% or more in order to increase the strength.

A content of Mn (manganese) is set to 1.00% or less in order to reduce a decrease in ductility. On the other hand, the content of Mn may be 0.10% or more in order to increase the strength.

A content of Cr (chromium) is set to 1.00% or more in order to increase the strength and improve nitriding properties. On the other hand, when a content of Cr increases, nitriding properties rather deteriorate, and a nitriding treatment becomes difficult. Therefore, the content is set to 4.00% or less.

When a content of Mo (molybdenum) is set to 0.5% or more, it is possible to improve the strength and toughness without degrading the ductility. On the other hand, when the content is 3.00% or less, a sufficient effect of improving the strength and toughness is obtained.

A content of V (vanadium) may be 0.1% or more in order to refine the grain size (i.e., to reduce the grain size to a minute size) and improve the strength and toughness. On the other hand, in order to reduce the amount of coarse carbides and reduce a decrease in the strength and toughness, a content of V is set to 1.0% or less.

The steel plate may further contain Ni. When Ni is contained, it is possible to reduce generation of carbides and improve the strength and toughness. When Ni is contained, a content thereof is preferably 4.0% or less and more preferably 2.0% or less.

$$159 \times C\ (\%) + 91 \times Si\ (\%) + 68 \times Cr\ (\%) + 198 \times Mo\ (\%) + 646 \geq 1000 \qquad \text{Formula 1:}$$

When the chemical composition of the steel plate satisfies Formula 1, the steel plate becomes a metal ring having excellent metal fatigue strength characteristics and excellent fatigue life.

In the steel plate, the remainder other than the above elements includes Fe and unavoidable impurities. The unavoidable impurities are elements that are inevitably mixed due to raw materials or a production process. The kinds of elements of the unavoidable impurities are not particularly limited, and include, for example, S (sulfur), P (phosphorus), N (nitrogen), O (oxygen), Al (aluminum), and Ti (titanium).

In the present embodiment, the width W (refer to FIG. 2) of the steel plate may be adjusted to the width of a continuously variable transmission (CVT) belt to be produced or may be larger than the width of a CVT belt to be produced. When a steel plate having a larger width than the width of the CVT belt is used, a cutting process may be provided when the CVT belt is produced, and the width of the steel plate may be adjusted to the width of the CVT belt. According to the production method of the present embodiment, since constriction in a welded part is reduced, it is possible to produce a CVT belt having excellent strength even with adjustment to a predetermined width of the CVT belt. In the present embodiment, the length L (refer to FIG. 2) of the steel plate may be appropriately adjusted according to a CVT belt to be produced. In addition, in the present embodiment, the thickness of the steel plate may be appropriately adjusted according to application purposes and the like and is not particularly limited. For example, the thickness may be 100 μm or more and 200 μm or less.

A method of producing an endless metal belt will be described with reference to FIG. 1. FIG. 1 is a flowchart showing an example of a method of producing an endless metal ring of the present embodiment. The method of producing an endless metal belt shown in the example in FIG. 1 includes at least a welding process (S11) in which ends of the steel plate are butted against each other, and the butted part is welded to form a ring shape, and a heat treatment process (S12) in which the ring-shaped steel plate is heated at an austenite transformation temperature or lower. Further, a process of removing a protruding part may be provided after the heat treatment process, and additionally, a cutting process and the like may be provided as necessary. The above processes will be described below.

Figure 2:
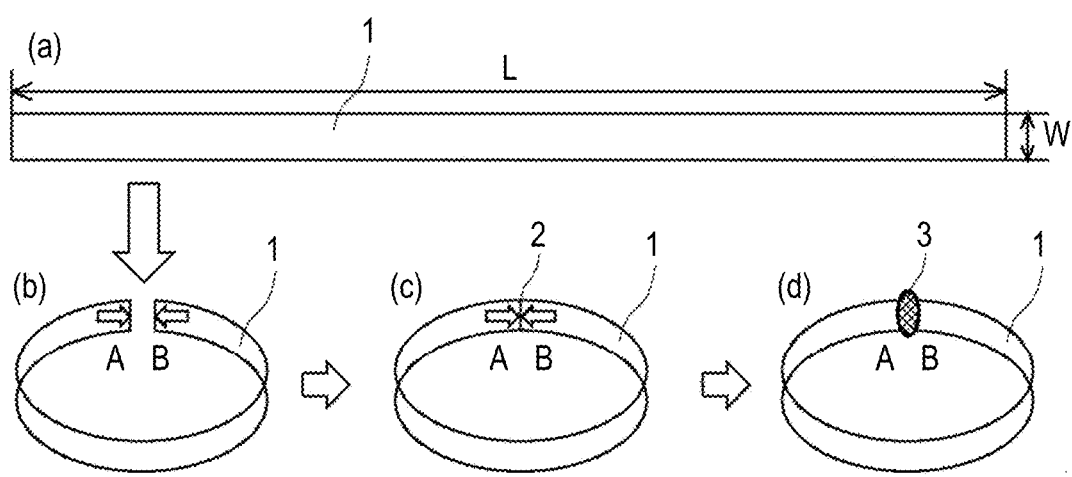
FIG. 2 is a schematic process drawing showing an example of a welding process.

The welding process will be described with reference to FIG. 2. FIG. 2 is a schematic process drawing showing an example of the welding process. In the example in FIG. 2, first, a belt-shaped steel plate 1 whose width W is adjusted for a CVT belt is prepared ((a) in FIG. 2). Next, while the steel plate is bent into a ring shape, one end A and the other end B of the steel plate are butted against each other ((b) and (c) in FIG. 2). Next, the ends are pressed against each other and welded by butt welding ((d) in FIG. 2). For the belt-shaped steel plate, for example, an elongated steel plate may be cut to have a predetermined size, and the steel plate produced in a predetermined size may be used. The steel plate can be bent using, for example, a roll or a mold.

Figure 3:
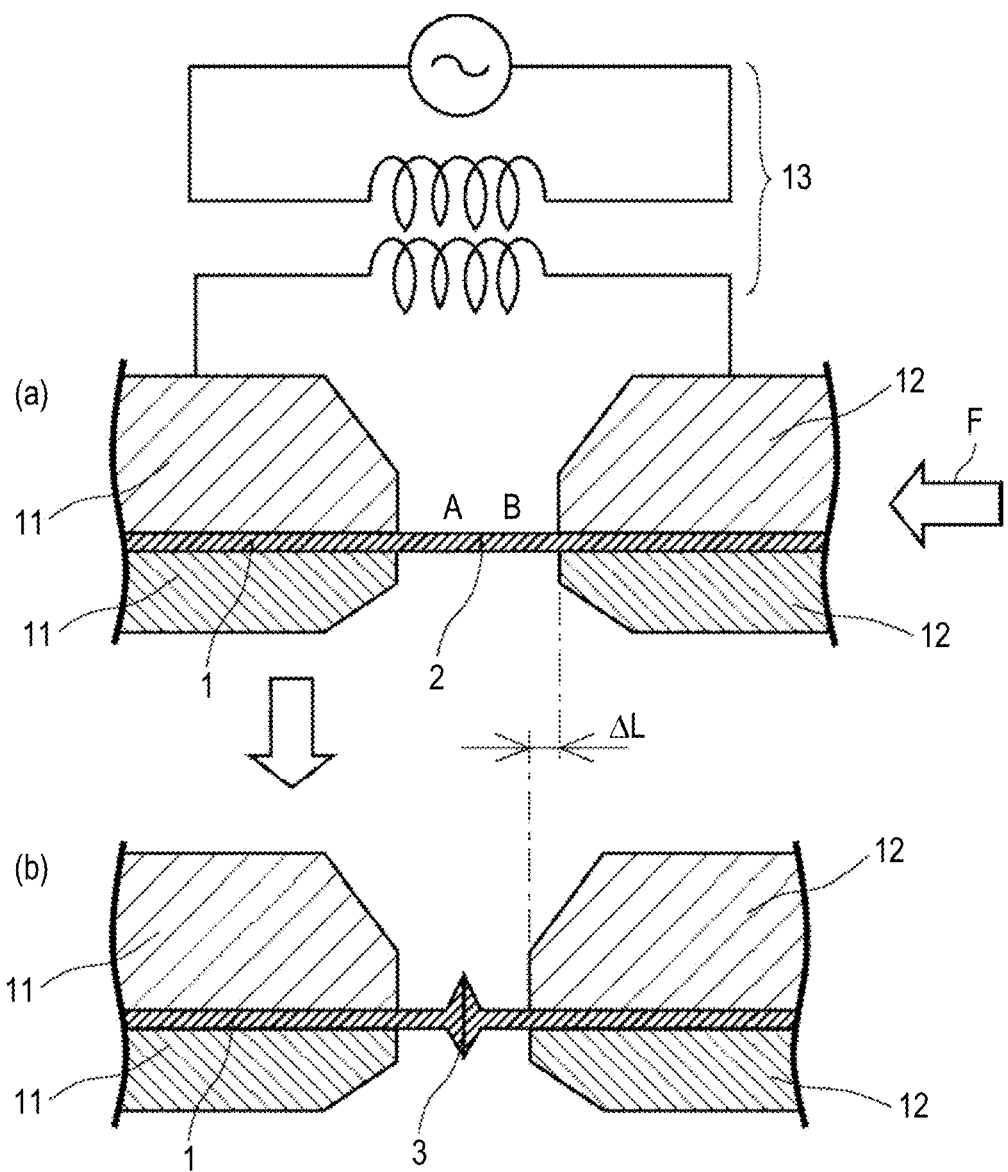
FIG. 3 is a schematic diagram schematically showing an example of butt welding of the present embodiment.

Next, butt welding in the present embodiment will be described in detail with reference to FIG. 3. FIG. 3 is a schematic diagram schematically showing an example of butt welding in the present embodiment. (a) in FIG. 3 is a diagram showing a state in which one end A and the other end B of the steel plate are butted against each other, and (b) in FIG. 3 is a diagram showing a state when welding is completed. Here, a power supply unit 13 is omitted in (b) in FIG. 3. In the example in FIG. 3, one end A of the steel plate is inserted into a fixed electrode 11 and the other end B of the steel plate is inserted into a movable electrode 12 that is movable in a horizontal direction. Here, the heights of the fixed electrode 11 and the movable electrode 12 are aligned (i.e., the heights of the fixed electrode 11 and the movable electrode 12 are the same). A force F is applied to the movable electrode 12 in a direction toward the fixed electrode 11 in advance. When a voltage is applied from the power supply unit 13, butted parts 2 are heated.

There are two embodiments of the method of producing an endless metal ring according to a heating temperature. The first embodiment of butt welding (resistance butt welding) is a method in which, while ends of the steel plate are heated at a temperature lower than a melting temperature, the ends are pressed against each other and welded. According to the first embodiment, since no dendritic phase is formed in the welded part, a process of heating at an austenite transformation temperature or higher for homogenizing is not necessary. According to the butt welding, since surface tension does not occur in the welded part, constriction in the welded part is reduced. The temperature lower than the melting temperature is a temperature preset according to a chemical composition of the steel plate, and is preferably a temperature that is higher than a softening point and lower than a melting point. The temperature of the ends of the steel plate may be directly measured, and a voltage of the power supply unit 13 for achieving a predetermined temperature and a heating time may be set in advance. When the ends of the steel plate are softened, the movable electrode 12 moves, and butted parts 2 are joined. It is possible to stably obtain a ring with a predetermined length by setting a voltage such that the voltage is turned off when the moving distance ΔL of the movable electrode 12 reaches a predetermined value. For example, a limit switch which may have a sub motor can be used to set a voltage such that the voltage is automatically turned off when the moving distance ΔL reaches a predetermined value.

The second embodiment of butt welding (resistance butt welding) is a method in which, while the ends of the steel plate are heated at a melting temperature or higher, the ends are pressed against each other and subjected to welding, and a melted part as a protruding part is extruded. According to the second embodiment, since a melted part in which a dendritic phase is formed is extruded as a protruding part, when the protruding part is removed, it is possible to form an endless metal ring having no dendritic phase, and a process of heating at an austenite transformation temperature or higher and homogenizing is not necessary. The temperature that is equal to or higher than the melting temperature is a temperature preset according to a chemical composition of the steel plate and is preferably set to a temperature close to a melting start temperature. The temperature of the ends of the steel plate may be directly measured, and a voltage of the power supply unit 13 for achieving a predetermined temperature and a heating time may be set in advance. When the temperature of the ends of the steel plate reaches a predetermined temperature, a force F applied to the movable electrode 12 increases and butted parts 2 are joined. It is possible to stably obtain a ring with a predetermined length by setting a voltage such that the voltage is turned off when the moving distance ΔL of the movable electrode 12 reaches a predetermined value.

Figure 4:
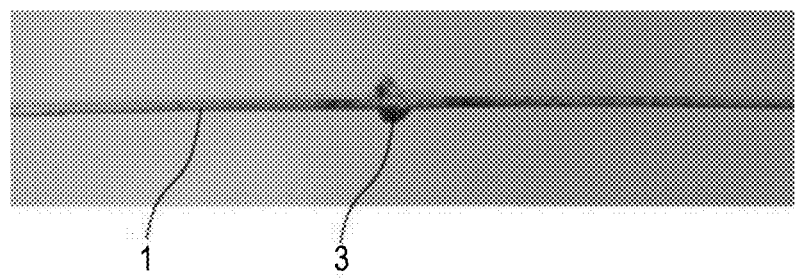
FIG. 4 is a photograph of a side surface of a steel plate after the welding process.

Since each of the rings welded according to the butt welding of the first embodiment and the second embodiment has a protruding part in a welded part 3 as shown in FIG. 4, generally, a process of removing a protruding part is provided in order to make the thickness of the ring constant. The process of removing a protruding part may be provided before or after a heat treatment process to be described below as long as it is performed after the welding process. In the present embodiment, the process of removing a protruding part may be performed after the heat treatment process to be described below. The method of removing a protruding part may be polishing using a grindstone or barrel polishing, or may be a method of scraping off a protruding part using a cutting tool such as a plane (tool).

Next, the heat treatment process in which the ring-shaped steel plate after the welding process is heated at an austenite transformation temperature or lower is performed. Since the ring-shaped steel plate obtained in the above welding process does not have a dendritic phase at least at a part of the ring thickness, when it is heated at an austenite transformation temperature or lower, the hardness of the entire ring can be changed to a uniform hardness at which rolling is possible. The heat treatment temperature is not particularly limited as long as it is the austenite transformation temperature or lower, and preferably, for example, 640° C. to 750° C. The heat treatment time may be, for example, 0.5 to 3 hours.

The endless metal ring obtained by the method of producing an endless metal ring of the present embodiment can be used as a component (material) of an endless metal belt member for CVT. For example, the endless metal belt member can be produced by rolling and quenching an endless metal ring and adjusting its circumferential length, and additionally, performing a nitriding treatment and the like as necessary.

The present disclosure will be described below in detail with reference to an example and a comparative example. However, the present disclosure is not limited by these descriptions.

Example: Production of Endless Metal Ring

Figure 5:
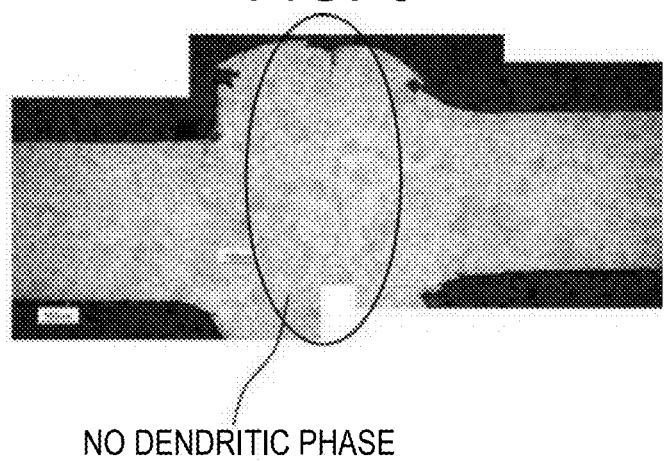
FIG. 5 is a microphotograph showing a cross section of a welded part of a steel plate after a welding process according to an example.
Figure 7:
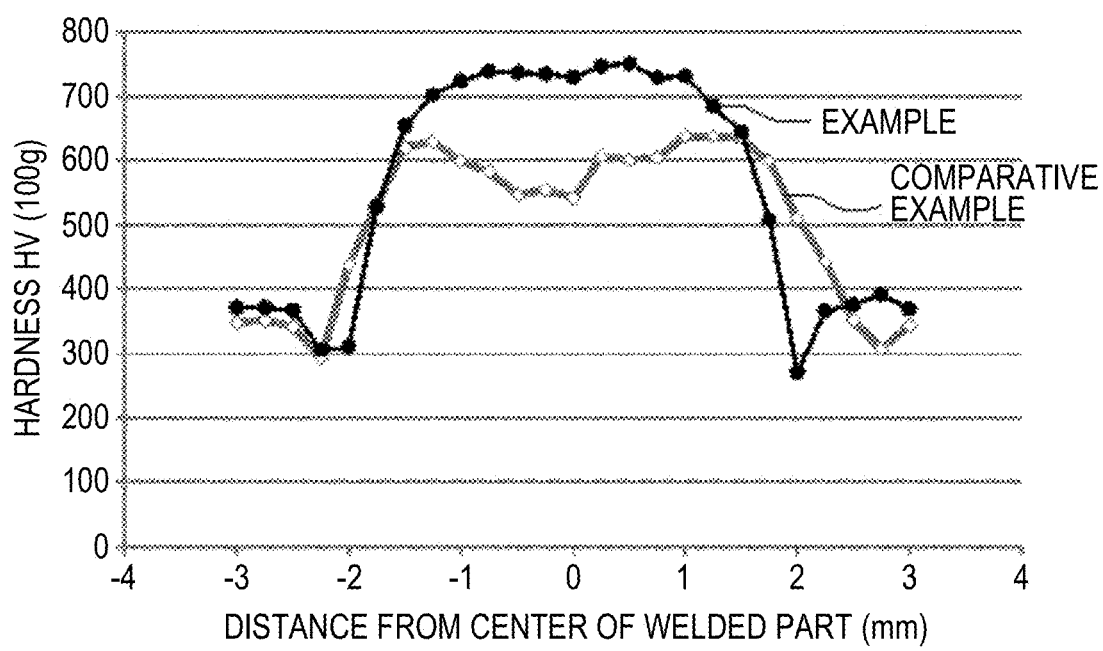
FIG. 7 is a graph showing distributions of the Vickers hardness at and near the welded parts of the steel plates after the welding process according to the example and the comparative example.

A belt-shaped steel plate having a chemical composition including 0.30 to 0.70% by mass of C, 2.50% by mass or less of Si, 1.00% by mass or less of Mn, 1.00 to 4.00% by mass of Cr, 0.50 to 3.00% by mass of Mo, and 1.00% by mass or less of V was prepared. The chemical composition satisfies the relationship of Formula 1. Formula 1 is 159×C (%)+91×Si (%)+68×Cr (%)+198×Mo (%)+646≥1000. The remainder of the chemical composition includes Fe and unavoidable impurities. Next, according to the examples in FIG. 2 and FIG. 3, while ends of the steel plate were heated at a temperature lower than a melting temperature, the ends were pressed against each other and subjected to butt welding (resistance butt welding). As shown in FIG. 4, the obtained welded part 3 had a burr (protruding part). The ring-shaped steel plate after welding was heated at 700° C. for 1 hour, and air-cooled. Then, the burr was removed using a cutting tool such as a plane (tool) and thereby an endless metal ring was obtained. FIG. 5 is a microphotograph showing a cross section of the welded part of the steel plate after the welding process. In addition, FIG. 7 shows a graph showing distributions of the Vickers hardness at and near the welded part of the steel plate after the welding process.

Comparative Example: Production of Endless Metal Ring

Figure 6:
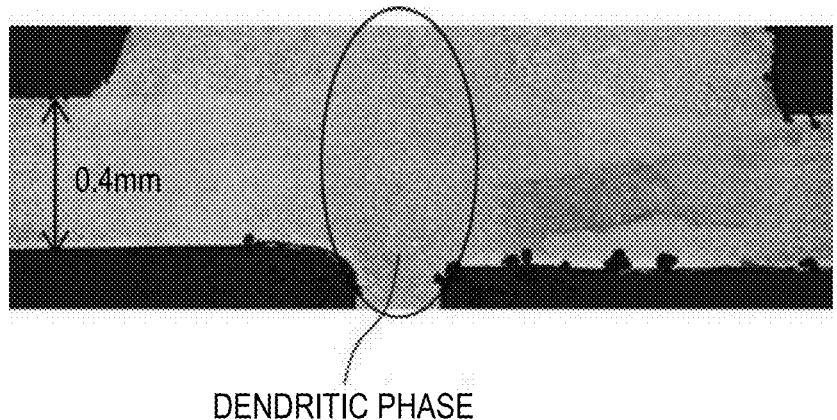
FIG. 6 is a microphotograph showing a cross section of a welded part of a steel plate after a welding process according to a comparative example.

An endless metal ring of a comparative example was obtained in the same manner as in the example except that, while ends of a steel plate were heated at a temperature higher than a melting temperature, the ends were pressed against each other slowly and subjected to butt welding. FIG. 6 is a microphotograph showing a cross section of the welded part of the steel plate after the welding process. In addition, FIG. 7 shows a graph showing distributions of the Vickers hardness at and near the welded part of the steel plate after the welding process.

As shown in FIG. 6, in the production method of the comparative example, a dendritic phase occurred in the welded part after butt welding. In addition, as shown in FIG. 7, a dendrite phase occurred in the welded part of the comparative example and the Vickers hardness at and near the welded part was low, and there was variation in the Vickers hardness at and near the welded part. On the other hand, in the production method of the example of the present disclosure, since the welded part was completely quenched after welding, the hardness of the joined parts became uniform. When the ring of the example was heated at 700° C. and air-cooled, the hardness of the joined parts was the same as that of the steel plate, and the hardness became uniform throughout the endless metal ring.

What is claimed is:

1. A method of producing an endless metal ring by butting and welding ends of a steel plate having a chemical composition including 0.30 to 0.70% by mass of C, 2.50% by mass or less of Si, 1.00% by mass or less of Mn, 1.00 to 4.00% by mass of Cr, 0.50 to 3.00% by mass of Mo, and 1.00% by mass or less of V, the chemical composition satisfying a relationship of Formula 1, and a remainder of the chemical composition including Fe and unavoidable impurities, wherein the Formula 1 is 159×C (%)+91×Si (%)+68×Cr (%)+198×Mo (%)+646≥1000, the method comprising:

inserting a first end of the steel plate into a fixed electrode;
inserting a second end of the steel plate into a movable electrode;
applying a voltage to the first and second ends of the steel plate so as to heat the first and second ends at a temperature higher than a softening point and lower than a melting temperature;
moving the movable electrode in a direction of the fixed electrode;
pressing the first and second ends against each other and welding the first and second ends by resistance butt welding; and
heating in a heat treatment process at an austenite transformation temperature or lower after the welding process,
wherein the voltage is turned off when a distance ΔL between the electrodes reaches a predetermined value.

2. The method according to claim 1, further comprising:
a process of removing a protruding part after the welding process.

3. The method according to claim 2, wherein the process of removing the protruding part is performed after the heat treatment process.

4. A method of producing an endless metal ring by butting and welding ends of a steel plate having a chemical composition including 0.30 to 0.70% by mass of C, 2.50% by mass or less of Si, 1.00% by mass or less of Mn, 1.00 to 4.00% by mass of Cr, 0.50 to 3.00% by mass of Mo, and 1.00% by mass or less of V, the chemical composition satisfying a relationship of Formula 1, and a remainder of the chemical composition including Fe and unavoidable impurities, wherein the Formula 1 is 159×C (%)+91×Si (%)+68×Cr (%)+198×Mo (%)+646≥1000, the method comprising:

inserting a first end of the steel plate into a fixed electrode;
inserting a second end of the steel plate into a movable electrode;
applying a voltage to the first and second ends of the steel plate so as to heat the first and second ends at a melting temperature or higher;
moving the movable electrode in a direction of the fixed electrode;
pressing the first and second ends against each other such that a melted part as a protruding part is extruded;
welding the first and second ends by resistance butt welding; and
heating in a heat treatment process at an austenite transformation temperature or lower after the welding process,
wherein the voltage is turned off when the distance ΔL between the electrodes reaches a predetermined value, and
wherein the protruding part is removed such that the ring does not have the protruding part at a part of the ring thickness.

5. The method according to claim 4, further comprising:
a process of removing the protruding part after the welding process.

6. The method according to claim 5, wherein the process of removing the protruding part is performed after the heat treatment process.

* * * * *